United States Patent

[11] 3,627,834

| [72] | Inventor | Germano Patron |
| | | Venezia, Italy |
| [21] | Appl. No. | 791,145 |
| [22] | Filed | Jan. 14, 1969 |
| [45] | Patented | Dec. 14, 1971 |
| [73] | Assignee | Montecatini Edison S.p.A. |
| | | Milan, Italy |
| [32] | Priority | Jan. 18, 1968 |
| [33] | | Italy |
| [31] | | 11718A/68 |

[54] PROCESS AND STABILIZING COMPOSITIONS FOR CHLOROFLUOROALKANES
4 Claims, No Drawings

[52] U.S. Cl. .................................. 260/652.5 R,
252/403, 252/405, 252/407
[51] Int. Cl. ........................................ C07c 17/42
[50] Field of Search ............................ 260/652.5;
252/407, 403, 405

[56] References Cited
UNITED STATES PATENTS

| 3,043,888 | 2/1962 | Pray et al. ............... | 260/652.5 |
| 3,085,116 | 4/1963 | Kvalnes ..................... | 260/652.5 |
| 3,090,818 | 5/1963 | Long ......................... | 260/652.5 |
| 3,152,191 | 10/1964 | Cormany et al. ........... | 260/652.5 |
| 3,183,192 | 5/1965 | Bauer ........................ | 260/652.5 X |
| 3,405,069 | 10/1968 | Houslay et al. ............ | 260/652.5 X |
| 3,445,527 | 5/1969 | Okamura .................... | 260/652.5 |

*Primary Examiner*—Howard T. Mars
*Attorney*—Stevens, Davis, Miller & Mosher

ABSTRACT: This specification discloses the stabilization of chlorofluoroalkanes and mixtures thereof against hydrolysis in the presence of substances of a polar character, and in particular the stabilization of $CCl_3F$, $CCl_2F_2$, $CCl_2F-CClF_2$, $CClF_2-CClF_2$, by incorporating either into the chlorofluoroalkane or into the mixture to be nebulized by it, as stabilizer, a composition comprising at least one alkylene epoxide associated with at least one substance chosen from the group consisting of linear and/or cyclic olefines and/or of simple and/or alkyl-substituted hydrazones of aliphatic and/or aromatic aldehydes.

PROCESS AND STABILIZING COMPOSITIONS FOR CHLOROFLUOROALKANES

The present invention relates to the stabilization of compositions based on chlorofluoroalkanes and to the resulting stabilized compositions as well as to the corresponding stabilizing compounds themselves. More particularly, this invention relates to the stabilization of compositions based on chlorofluoroalkanes by adding, in minor proportions, special associations of compounds as stabilizers, which have proved highly effective for the stabilization of said chlorofluoroalkanes against hydrolysis in the presence of substances having a polar character.

It is known that the compounds that can be classified as chlorofluoroalkanes, under normal conditions, are by themselves quite stable, and that, furthermore, this stability is maintained even under conditions (heat, oxygen, light, etc.) which in general cause decomposition or degrading phenomena to a greater or lesser degree in other halogenated hydrocarbons (e.g., chlorohydrocarbons) with the formation of acid products such as HCl, or toxic products such as phosgene, etc.

It is furthermore known that the chlorofluoroalkanes do not maintain their stability in the presence of primary or secondary alcohols or, in general, in the presence of substances having a polar character (alcohols, polyalcohols, water, etc.) In fact, in this case the reaction between the chlorofluoroalkane and, for instance, the primary or secondary alcohol leads to the reduction of the chlorofluoroalkane to a compound having a lower degree of halogenation, besides leading also to the formation of, respectively, aldehyde and ketone of the corresponding alcohol and to the development of HCl. These oxidation phenomena, or phenomena of hydrolysis, are particularly interesting from the point of view of the industrial utilization of the chlorofluoroalkanes in question.

Lately, as a matter of fact, the chlorofluoroalkanes (amongst many other industrial applications) have found a use also in the field of products to be nebulized in the form of an aerosol according to the so-called "spray" techniques, as well as in the technique of foaming substances, such as for instance the urethane foams.

In these applications, as a matter of fact, in the case of the spray technique, the chlorofluoroalkane or a mixture of chlorofluoroalkanes constitutes merely the propellant for the liquid or solid substance to be nebulized, which in turn is employed in solution in a suitable solvent, usually a primary or secondary alcohol.

In the case of the foaming technique, for instance the urethane foams, the chlorofluoroalkanes or the mixtures thereof form on the contrary the expanding agent for obtaining foams from the reacting substances which are constituted, in the case of the urethane foams, by a polyisocyanate and a polyalcohol.

Practically, in the standard application techniques the chlorofluoroalkane used as propellant or as an expanding agent comes into contact with alcohols or polyalcohols or at any rate with substances having a polar character.

Thus, in applying these techniques there arise the conditions mentioned above for the reaction of the chlorofluoroalkane with the polar substance with the consequent degrading of the former with development of aldehydes or of ketones and HCl.

The development of HCl leads to an attack upon the metal parts in contact with it, for instance of the metal container, with the development of hydrogen and an increase of the internal pressure, causing in turn a deformation and final bursting of the container, apart from the possible degrading reaction with the substances to be nebulized or expanded. Moreover, the aldehydes or ketones thereby formed, because of their color, smell and/or the subsequent formation of condensation products, have a serious adverse effect on the aerosol compositions and on the foams.

Such drawbacks are overcome by the addition to the aerosol or foaming mixtures, constituted, as already indicated, by the propellant or by the expanding agent (a chlorofluoroalkane or a mixture of a mixture of chlorofluoroalkanes such as for instance $CCl_3F$, $CCl_2F_2$, $CCl_2F$—$CClF_2$, $CClF_2$—$CClF_2$, etc.) and by the liquid or solid substances dissolved in the polar solvent or by the substances reacting with the other substances of a polar character (primary or secondary alcohols, polyalcohols), of a suitable inhibitor or stabilizer of the chlorofluoroalkane, which retards the reactivity towards the other components of the mixture.

Many inhibiting substances are known which, besides the fundamental stabilizing characteristics, must also meet definite characteristics dependent on the nature and type of the expected use. Thus, they must not be harmful directly or indirectly to man (human skin, foodstuffs, etc.) and furthermore, in special cases (hair sprays, etc.) they must not influence adversely the characteristics of color or perfume of the substances to be nebulized.

From the above resume, it will appear quite clearly how important it is to provide an inhibitor or stabilizer that fully meets these requirements.

Amongst the various stabilizers known in the literature for the "spray" or aerosol technique, the most widely employed are the mononitroalkanes having from one to three carbon atoms, vinyl chloride or vinyl fluoride, particular olefines such as butadiene, isoprene and propylene, methylmethacrylate. These are employed in quantities varying from 0.1 percent to 5 percent, calculated on the weight of the chlorofluoroalkane. They may also be employed in admixture with each other.

Also known is the use of hydroquinone as well as the use of cyclodienes and methoxycompounds, these latter particularly for the production of foamed urethane polymers, in which the foaming agent is generally a chlorofluoroalkane stabilized against the reaction with the polyalcohols present.

Finally, chlorofluoroalkanes used for the food industry have been stabilized by inhibitors based on $N_2O$ and $CO_2$ and their mixtures.

Not all the stabilizing compounds mentioned above meet fully and contemporaneously the purposes and characteristics desired, both so far as the effectiveness is concerned as well as with regard to the duration of the protection against the degrading phenomena, etc.

Thus, the object of this invention is that of providing stabilizing compositions particularly suited for hindering the reaction of chlorofluoroalkanes with substances having a polar character, such as primary or secondary alcohols, which compositions shall also fully meet the other requisites normally required for similar inhibitors, and that they furthermore shall not present the drawbacks associated with the compositions already in use.

As a matter of fact, it has been surprisingly found in accordance with the present invention that an effective and lasting protection, particularly against the hydrolysis of the chlorofluoroalkanes used in the formulations of the aerosol type by substances having a polar character (primary or secondary alcohols), is achieved by the addition to the aerosol mixture of a synergistic stabilizing composition consisting of at least one alkylene epoxide associated with at least one substance selected from the group consisting of olefines and/or hydrazones of linear or aromatic aldehydes.

Another object of this invention is that of providing compositions suitable for use in stabilization as described above, which shall be sufficiently volatile, nonacid, nontoxic and cheap.

A further object of this invention is that of providing compositions which shall be highly effective even at low concentrations and for long periods of time under even the most severe storage conditions.

Still other objects of the invention will become apparent from the description of this invention that follows.

The stabilizing compositions which are among the objects of this invention are, as a matter of fact, volatile, nonacid, nontoxic and highly effective at small concentrations besides being obtainable at a low cost.

A further advantage is represented by the fact that the inhibiting action extends over periods of time of more than 7–8 months, under severe storage conditions and without any trace of degradation of the aerosol into its components and of corrosion of the containers.

Still another advantage consists in the provision of stabilizers which, by their very chemical nature and because the low concentrations at which they are employed, have no contraindications as far as the odor or the color of the substances in question is concerned.

These, and still other objects and advantages which will more clearly appear to one skilled in the art from the following description, are attained, according to the present invention, by synergistic compositions acting as stabilizers against the hydrolysis of chlorofluoroalkanes by the reaction thereof with substances of a polar nature, such as alcohols or water, and consisting of at least one alkylene epoxide associated with at least one substance selected from the group consisting of linear or cyclic olefines and/or of the simple and/or alkyl-substituted hydrazones of aliphatic and/or aromatic aldehydes.

The inhibiting effect is quite specific for the above-described compositions; similar compounds used singly are far much less effective, while the inhibitors commonly used for the above-mentioned stabilization of chlorohydrocarbons (such as hydroquinone or phenolic compounds) are of little or no effectiveness at all for the applications contemplated by the present invention both because of the low volatility, as well as the color, the toxicity and the acidity.

More particularly, the stabilizing process which is one of the objects of this invention, and which is of a sure and lasting effectiveness against the decomposition of the chlorofluoroalkanes and their mixtures used as propellants in the aerosol field, by the reaction thereof with substances of a polar nature, such as alcohols, water, etc., is accomplished by adding to the chlorofluoroalkane or to chlorofluoroalkane mixtures small quantities of a synergistically active composition consisting of at least one alkylene epoxide, preferably chosen from a group comprising ethylene oxide, propylene oxide, butylene oxide, amylene oxide, chloropropylene oxide or glycidol, associated with at least one of the compounds of the group consisting of linear or cyclic olefines, preferably di-isobutylene, 2-methylpentene-1, cyclohexene and of the simple hydrazone or the alkyl-substituted hydrazone of an aliphatic or aromatic aldehyde, preferably formaldehyde, acetaldehyde, crotonaldehyde, butyraldehyde, isobutyraldehyde, and benzaldehyde.

The synergistic stabilizing composition, which is an object of this invention, is thus constituted by a mixture which is at least binary or ternary, depending on whether the epoxide is accompanied by one or by both of the other components, and on whether within the mixture itself the component substances are distributed according to the following mutual approximate proportions given as percentages of the total weight:

Binary mixture

1. Epoxide: from 50 to 83 percent, preferably from 50 to 62 percent; Olefine: from 17 to 50 percent, preferably from 38 to 50 percent;

2. Epoxide: from 96 to 98 percent, preferably 97 percent; Hydrazone: from 2 to 4 percent, preferably 3 percent.

Ternary mixture

Epoxide: from 49 to 80 percent, preferably from 49 to 61 percent;

Olefine: from 16 to 49 percent, preferably from 37 to 49 percent;

Hydrazone: from 2 to 4 percent, preferably 2 percent.

The total amount of stabilizer to be added to the chlorofluoroalkane according to the present invention, and the relative quantities of the individual components of the synergistic mixture, obviously depend both on the type of chlorofluoroalkane or mixture of chlorofluoroalkanes to be stabilized, as well as on the use contemplated and on the degree of stability desired, as well also as on the possible presence of other additives.

In general, for the most common applications contemplated, quite satisfactory concentrations of total stabilizer lie between 0.06 and 1.5 percent by weight based on the chlorofluoroalkane to be stabilized, and preferably from 0.2 to 0.8 percent; while the quantities of the individual components of the synergistic mixture may vary within that range as follows:

from 0.05 to 0.1 percent, preferably from 0.1 to 0.5 percent for the epoxide, from 0.01 to 0.5 percent, preferably from 0.1 to 0.3 percent for the olefine, and from 0.002 to 0.03 percent, preferably from 0.003 to 0.015 percent for the hydrazone, all expressed as quantities by weight based on the chlorofluoroalkane to be stabilized.

Greater quantities may of course be used but are not necessary, while smaller quantities will give a shorter effectiveness.

The chlorofluoroalkanes that may be stabilized according to the present invention comprise more particularly: trichlorofluoromethane, dichlorodifluoromethane, 1,1,2-trichloro-1,2,2-trifluoroethane, 1,2-dichloro-1,1,2,2-tetrafluoroethane and their mixtures.

The components of the synergistic stabilizing mixtures of the present invention are, in general, very soluble both in the chlorofluoroalkanes as well as in the alcohol solvents used (in general, alcohols of a low molecular weight having from one to five carbon atoms, such as methanol, ethanol, propanol, etc.), and therefore the operation of adding the inhibitor does not present any difficulty whatsoever and may in any case be conducted according to the usual techniques well known in the art.

The invention will now be described in more detail by reference to the examples reported below in tables 1 and 2, which are given merely for illustrative purposes: In table 1, together with the data of the examples carried out according to the present invention (i.e., the group of tests D from No. 8 to No. 14), there have also been recorded for comparative purposes the following tests:

GROUP A—comprising test No. 1, conducted on trichlorofluoromethane as such and alone.

GROUP B—comprising test No. 2, conducted on the same chlorofluoroalkane in admixture with ethanol, not stabilized.

GROUP C—comprising tests from Nos. 3 to 7, conducted on the same chlorofluoroalkane in admixture with ethanol, and separately stabilized with the single components of the synergistic compositions exemplified according to the present invention in the test group D.

Finally, it will be noted that in the test group D, tests Nos. 8, 9 and 10 refer to binary compositions epoxide + olefine, tests Nos. 11 and 12 concern ternary compositions epoxide + olefine + hydrazone, while tests Nos. 13 and 14 refer to binary compositions epoxide + hydrazone.

The tests of table 1 were conducted according to the following rules and conditions:

The chlorofluoroalkane used was always, except for test No. 1, trichlorofluoromethane mixed with 95 percent ethanol according to a weight ratio equal to 1:1.

The evaluation of the stability characteristics was carried out on the basis of the standard test for accelerated oxidation as described in the U.S.A. Army Navy-Aeronautical Specification Standards MILT-7003 and Federal Specification OT–634a standards, but slightly modified as indicated below.

This stability test consists in boiling under reflux for 48 hours (here the period was reduced to 24 hours) in a 500 ml. flask, 200 ml. of trichlorofluoromethane admixed with the cited quantities of alcohol and stabilizer, and bubbling through it, by means of a glass pipe of 3 mm. diameter, oxygen saturated with water at a rate of 10–12 bubbles per minute. Into the vapor phase was suspended a small steel plate of dimensions ½ inch × 2 inch × 1/16 inch while into the liquid phase was introduced another small steel plate of dimensions ¼ inch × ¾ inch × 1/16 inch. As a light and heat source there was used a frosted 150 watt lamp placed under the flask (here the distance of the lamp form the flask was adjusted to 60 ±2 mm. by means of a suitable rig). Furthermore, here the temperature of the refrigerants was brought down to −20° C. by means of a cryostat and with methanol as recycling cooling liquid.

At the end of the test there was determined the acidity of the mixture and the pH of the aqueous extracts using always the same water/chlorofluoromethane (1:1) ratio. The aspect of the small steel plates and of the mixture itself was also considered.

Finally, it is noted that the percentages of the different additives have been given by weight on the basis of 100 parts by weight of chlorofluoroalkane.

In table 2 are reported some comparative tests upon storage under severe environmental conditions.

The tests of table 2 were carried out according to the following procedure: Mixtures of trichlorofluoromethane and 95 percent ethanol, in the same ratios used in the tests summarized in table 1, were stabilized (tests No. 1 and No 2) with compositions according to the present invention, and with nonsynergized stabilizers (tests Nos. 3 and 4) as a comparison.

The various mixtures were introduced into similar pressuretight and clear glass bottles together with aluminum strips weighing from 2.3 to 2.5 g. and 20 × 140 mm. in size, half-immersed in the mixture.

The bottles were exposed externally to thermal variations and to light and natural irradiation variations, from Oct. 1966 to July 1967. The thermal variations reached the limits of about −5° C. and +50° C.

From the examination of the results shown in tables 1 and 2, it is evident that by itself the chlorofluoroalkane is stable under the tested conditions (Group A, test No. 1), while in the presence of an alcohol (95 percent ethanol) without stabilization there occurs on the contrary a marked degradation of the mixture (compare the pH values and acidity of test No. 1 with those of test No. 2 of group B).

Furthermore it can clearly be seen that, while the addition of a normal stabilizer (tests No. 3, 4, 5, 6 and 7 of Group C) slows down the degradation process, the addition of a synergistic stabilizing composition according to the present invention (tests No. 8, 9, 10, 11, 12, 13 and 14 of group D) allows one, surprisingly, to obtain far much better results, both from the point of view of a lesser acidity as well as from the point of view of coloring and corrosion.

Table No. 2 shows, furthermore, that 8 months after the start of the tests conducted in parallel, the mixtures stabilized with synergistic compositions according to the present invention (tests Nos. 1 and 2), in concentrations of the order of 0.15 percent, did not show any phenomenon of corrosion, while the same mixtures stabilized with the single nonsynergized compounds, under the same conditions (test No. 3) and even at greater concentrations (test No. 4), after the same period of time showed phenomena of heavy corrosion.

Since the order of magnitude of the duration of the stabilization required by market conditions actually amounts to from 6 to 10 months, the importance of the results achieved by following the present invention appears quite evident.

Of course, except for the limitations defined in the preceding description, the substances and the proportions exemplified hereinabove may be varied widely without thereby falling outside the spirit and the objects of this invention as claimed hereinafter.

TABLE 1

| Group | Test | Composition of the mixture | Stabilizer Compound | Percent by weight based on the chlorofluoromethane | pH aqueous extract Before | pH aqueous extract After | Acidity ml. HCl (0,1 N) per 100 cc. of chlorofluoromethane | Color assumed by the mixture | State of the small steel plate |
|---|---|---|---|---|---|---|---|---|---|
| A | 1 | Trichlorofluoromethane as such. | Without stabilizer | | 7.0 | 6.7 | 0.01 | Colorless | Glossy, unattacked. |
| B | 2 | Trichlorofluoromethane plus 95% ethanol (ratio by weight 1:1). | do | | 7.0 | 1.8 | 160.00 | Straw-yellow | Dirty, corroded. |
| C | 3a | do | Di-isobutylene | 0.1 | 7.0 | 2.3 | 48.00 | Greenish yellow. | Dull black. |
| | 3b | do | do | 0.2 | 7.0 | 2.3 | 44.00 | do | Do. |
| | 3c | do | do | 0.4 | 7.0 | 2.4 | 32.90 | Yellow | Dull. |
| | 4a | do | Cyclohexene | 0.1 | 7.0 | 2.0 | 88.00 | Straw-yellow | Do. |
| | 4b | do | do | 0.2 | 7.0 | 2.1 | 88.00 | do | Do. |
| | 4c | do | do | 0.4 | 7.0 | 2.3 | 45.20 | do | Do. |
| | 5a | do | 2-methylpentene-1 | 0.1 | 7.0 | 2.1 | 70.00 | Greenish yellow. | Dull black. |
| | 5b | do | do | 0.2 | 7.0 | 2.3 | 44.00 | do | Do. |
| | 5c | do | do | 0.4 | 7.0 | 2.5 | 24.00 | Yellow | Dull. |
| | 6a | do | Propylene oxide | 0.2 | 7.0 | 2.1 | 60.00 | Straw-yellow | Dull black. |
| | 6b | do | do | 0.4 | 7.0 | 2.0 | 94.40 | do | Dull. |
| | 7 | do | Dimethylbenzal hydrazone. | 0.005 | 7.0 | 4.4 | 1.6 | Yellowish | Slightly dulled. |
| D | 8 | do | Propylene oxide / Di-isobutylene | 0.2 / 0.2 | 7.0 | 5.2 | 0.24 | Light | Dulled. |
| | 9 | do | Propylene oxide / Cyclohexene | 0.2 / 0.2 | 7.0 | 5.4 | 0.16 | Slightly straw colored. | Do. |
| | 10 | do | Propylene oxide / 2-methylpentene-1 | 0.2 / 0.2 | 7.0 | 5.3 | 0.24 | do | Do. |
| | 11 | do | Cyclohexene / Propylene oxide / Dimethylbenzal hydrazone. | 0.2 / 0.2 / 0.0035 | 7.0 | 6.4 | 0.10 | Colorless | Slightly dulled. |
| | 12 | do | Diisobutylene / Propylene oxide / Dimethylbenzal hydrazone. | 0.2 / 0.2 / 0.0035 | 7.0 | 5.4 | 0.12 | do | Do. |
| | 13 | do | Propylene oxide / Dimethylbenzal hydrazone. | 0.2 / 0.005 | 7.0 | 5.3 | 0.16 | Straw-yellow | Do. |
| | 14 | do | Propylene oxide / Dimethylmethylenehydrazone. | 0.2 / 0.01 | 7.0 | 5.5 | 0.10 | Light | Do. |

TABLE 2

| Test | Composition of the mixture | Stabilizer Compound | Percent by weight, based on the chlorofluoromethane | State of the small plate |
|---|---|---|---|---|
| 1 | Trichlorofluoromethane plus 95% ethanol (ratio by weight 1:1). | Di-isobutylene plus propylene oxide. | 0.1 / 0.05 | No traces of corrosion. |
| 2 | do | Cyclohexene plus propylene oxide. | 0.1 / 0.05 | Slight attack on the interphase line. |
| 3 | do | 2-methylpentene-1 | 0.1 | Attack on the whole small plate, which appears to have disappeared 50%. |
| 4 | do | do | 0.2 | Heavily corroded on the whole surface, and particularly on the interphase line. |
| 5 | do | Di-isobutylene | 0.1 | Corroded in the part in contact with the liquid phase. The part in contact with the vapor phase is also corroded further showing on the surface the presence of aluminum salts. |
| 6 | do | do | 0.2 | Corrosion phenomena slightly lighter than in Test 5. |
| 7 | do | Cyclohexene | 0.1 | Heavily corroded (pitting corrosion). The plate shows a loss in weight of about 80%. |
| 8 | do | do | 0.2 | Corrosion phenomena slightly lighter than in Test 7. The presence of aluminum salts is noted on the surface. |

What is claimed is:

1. A composition stabilized against hydrolysis by reaction with alcohols, water and their mixtures, comprising:
   a. chlorofluoroalkanes having up to two carbon atoms;
   b. unsubstituted and methyl-substituted hydrazones of aldehydes selected from the group consisting of formaldehyde, acetaldehyde, butyraldehyde, isobutyraldehyde, crotonaldehyde and benzaldehyde;
   c. an olefin selected from the group consisting of di-isobutylene, 2-methyl-penetene-1, cyclohexene and their mixtures; and
   d. an epoxide selected from the group consisting of ethylenic-, propylenic-, butylenic-, amylenic-, chloropropylenic-, oxides, glycidol and their mixtures; wherein the sum of components (b), (c), and (d) is from 0.06 percent to 1.5 percent expressed by weight with respect to component (a), from 0.002 percent to 0.03 percent for component (b), from 0.01 percent to 0.5 percent for component (c) and from 0.05 percent to 1 percent for component (d).

2. A composition according to claim 1 wherein said components (b), (c) and (d) are present in a total amount of from 0.2 percent to 0.8 percent component (b) is present in an amount from 0.003 percent to 0.015 percent, component (c) is present in an amount from 0.1 percent to 0.3 percent, and component (d) is present in an amount from 0.1 percent to 0.5 percent.

3. The composition according to claim 1, wherein said hydrazone is di-methyl-benzal hydrazone.

4. The composition according to claim 1, wherein said hydrazone is di-methyl-methylene hydrazone.